US012142066B2

(12) United States Patent
Fang et al.

(10) Patent No.: US 12,142,066 B2
(45) Date of Patent: Nov. 12, 2024

(54) ARTIFICIAL INTELLIGENCE-BASED IMAGE PROCESSING METHOD, APPARATUS, DEVICE, AND STORAGE MEDIUM

(71) Applicant: Tencent Technology (Shenzhen) Company Limited, Shenzhen (CN)

(72) Inventors: Yuqi Fang, Shenzhen (CN); Niyun Zhou, Shenzhen (CN); Jianhua Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 363 days.

(21) Appl. No.: 17/750,183

(22) Filed: May 20, 2022

(65) Prior Publication Data

US 2022/0277572 A1    Sep. 1, 2022

Related U.S. Application Data

(63) Continuation of application No. PCT/CN2021/099559, filed on Jun. 11, 2021.

(30) Foreign Application Priority Data

Jun. 30, 2020 (CN) .......................... 202010614446.9

(51) Int. Cl.
*G06V 20/70* (2022.01)
*G06N 3/044* (2023.01)
(Continued)

(52) U.S. Cl.
CPC ............... *G06V 20/70* (2022.01); *G06T 3/40* (2013.01); *G06T 7/0012* (2013.01); *G06T 7/11* (2017.01);
(Continued)

(58) Field of Classification Search
None
See application file for complete search history.

(56) References Cited

U.S. PATENT DOCUMENTS

2019/0050981 A1\* 2/2019 Song .................... A61B 5/7267
2019/0073774 A1\* 3/2019 Kwant .................... G06T 7/143
(Continued)

FOREIGN PATENT DOCUMENTS

CN          108629772 A       10/2018
CN          108846385 A       11/2018
(Continued)

OTHER PUBLICATIONS

Acuna et al., Efficient Interactive Annotation of Segmentation Datasets with Polygon-RNN++, IEEE/CVF Conference on Computer Vision and Pattern Recognition (Year: 2018).\*
(Continued)

*Primary Examiner* — Mohammed Rachedine
(74) *Attorney, Agent, or Firm* — Morgan, Lewis & Bockius LLP

(57) ABSTRACT

This application discloses an artificial intelligence-based image processing method, apparatus, device, and storage medium, and relates to the field of computer technology. The method includes: obtaining a slice image; dividing the slice image to obtain a plurality of image blocks; feeding the plurality of image blocks into a labeling model, extracting, by the labeling model, a pixel feature of the slice image based on the plurality of image blocks, determining a plurality of vertex positions of a polygonal region in the slice image based on the pixel feature, concatenating the plurality of vertex positions, and outputting label information of the slice image, the polygonal region being a region in which a target pathological tissue of interest is located.

18 Claims, 7 Drawing Sheets

(51) Int. Cl.
*G06N 3/045* (2023.01)
*G06N 3/08* (2023.01)
*G06T 3/40* (2006.01)
*G06T 7/00* (2017.01)
*G06T 7/10* (2017.01)
*G06T 7/11* (2017.01)
*G06T 7/73* (2017.01)
*G06T 9/00* (2006.01)
*G06V 10/774* (2022.01)
*G06V 10/776* (2022.01)
*G06V 10/80* (2022.01)

(52) U.S. Cl.
CPC .............. *G06T 7/73* (2017.01); *G06V 10/774* (2022.01); *G06V 10/776* (2022.01); *G06V 10/806* (2022.01); *G06T 2207/20021* (2013.01); *G06T 2207/20081* (2013.01); *G06V 2201/03* (2022.01)

(56) References Cited

U.S. PATENT DOCUMENTS

| | | | |
|---|---|---|---|
| 2019/0188848 A1 | 6/2019 | Madani et al. | |
| 2019/0294970 A1* | 9/2019 | Fidler | G06N 3/044 |

FOREIGN PATENT DOCUMENTS

| | | | | | |
|---|---|---|---|---|---|
| CN | 109461167 A | 3/2019 | | | |
| CN | 109543683 A | 3/2019 | | | |
| CN | 109800631 A | 5/2019 | | | |
| CN | 110517771 A | 11/2019 | | | |
| CN | 110766701 A | 2/2020 | | | |
| CN | 110909756 A | 3/2020 | | | |
| CN | 111091576 A | 5/2020 | | | |
| CN | 111739035 A | 10/2020 | | | |
| CN | 111753843 A | * | 10/2020 | ............. | G06K 9/342 |
| CN | 111259366 B | * | 6/2021 | ............. | G06F 21/36 |
| CN | 110245657 B | * | 8/2021 | ........... | G06K 9/3233 |

OTHER PUBLICATIONS

Tencent Technology, ISR, PCT/CN2021/099559, Jul. 27, 2021, 2 pgs.
David Acuna et al., "Efficient Interactive Annotation of Segmentation Datasets with Polygon-RNN++", 2018 IEEE/CVF Conference on Computer Vision and Pattern Recognition, IEEE, Jun. 18, 2018, 10 pgs.
Lluís Castrejon et al., "Annotating Object Instances with a Polygon-RNN", Cornell University Library, Apr. 19, 2017, 9 pgs.
Tencent Technology, Extended European Search Report and Supplementary Search Report, EP21832435.8, Apr. 18, 2023, 11 pgs.
Tencent Technology, Japanese Office Action, JP Patent Application No. 2022-555626, Aug. 29, 2023, 9 pgs.
Tencent Technology, WO, PCT/CN2021/099559, Jul. 27, 2021, 5 pgs.
Tencent Technology, IPRP, PCT/CN2021/099559, Dec. 13, 2022, 6 pgs.

* cited by examiner

ARTIFICIAL INTELLIGENCE-BASED IMAGE PROCESSING METHOD, APPARATUS, DEVICE, AND STORAGE MEDIUM

CROSS-REFERENCE TO RELATED APPLICATIONS

This application is a continuation application of PCT Patent Application No. PCT/CN2021/099559, entitled "IMAGE PROCESSING METHOD AND APPARATUS BASED ON ARTIFICIAL INTELLIGENCE, AND DEVICE AND STORAGE MEDIUM" filed on Jun. 11, 2021, which claims priority to Chinese Patent Application No. 202010614446.9, filed with the China National Intellectual Property Administration on Jun. 30, 2020, and entitled "ARTIFICIAL INTELLIGENCE-BASED IMAGE PROCESSING METHOD, APPARATUS, DEVICE, AND STORAGE MEDIUM", all of which are incorporated herein by reference in their entirety.

FIELD OF THE TECHNOLOGY

This application relates to the field of computer technology, and in particular, to an artificial intelligence-based image processing method, apparatus, and device, and a storage medium.

BACKGROUND OF THE DISCLOSURE

Lymph node metastasis often occurs in many cancers, such as breast cancer, colorectal cancer, pancreatic cancer, and the like. Generally, the more cancer cells have metastasized to lymph nodes, the worse a patient's prognosis. Therefore, a location of a lymph node metastasis region needs to be determined by processing a slice image, and then a diagnosis is made and a treatment plan is laid out.

In an artificial intelligence-based image processing method currently, a complete pathological image is usually labeled manually to label a region in which a target human tissue is located, and obtain label information of the pathological image. Then a pathological image training model that carries the label information is put in use. For example, a bounding box or an extreme point needs to be labeled manually, or a graffiti label needs to be attached manually, all requiring manual label information as a-priori information for generating a corresponding semantic segmentation mask.

The training of a deep learning algorithm relies on a large amount of manually labeled data. A complete pathological image usually includes tens of thousands of pixels, and is manually labeled in a very cumbersome, time-consuming, and labor-costly manner. In addition, the regions in which the target human tissues are located, which are labeled in some labeling methods, are not intersecting, thereby conflicting with characteristics of the region in which the target human tissue is located. The characteristics of the region in which the target human tissue is located are that the edges of the region are continuous and the region includes no pores. Consequently, the image is processed inaccurately at very low efficiency.

SUMMARY

Embodiments of this application provide an artificial intelligence-based image processing method, apparatus, and device, and a storage medium to increase accuracy and efficiency of the image processing method. The technical solutions are described below.

According to an aspect of this application, an artificial intelligence-based image processing method is provided. The method includes:
obtaining a slice image;
dividing the slice image to obtain a plurality of image blocks; and
feeding the plurality of image blocks into a labeling model, extracting, by the labeling model, a pixel feature of the slice image based on the plurality of image blocks, determining a plurality of vertex positions of a polygonal region in the slice image based on the pixel feature, concatenating the plurality of vertex positions, and outputting label information of the slice image, the polygonal region being a region in which a target human tissue is located.

According to an aspect of this application, an artificial intelligence-based image processing apparatus is provided. The apparatus includes:
an obtaining module, configured to obtain a slice image;
a cutting module, configured to cut the slice image to obtain a plurality of image blocks; and
a processing module, configured to input the plurality of image blocks into a labeling model, extract, by the labeling model, a pixel feature of the slice image based on the plurality of image blocks, determine a plurality of vertex positions of a polygonal region in the slice image based on the pixel feature, concatenate the plurality of vertex positions, and output label information of the slice image, the polygonal region being a region in which a target human tissue is located.

According to an aspect of this application, a computer device is provided. The computer device includes a processor and a memory. The memory stores at least one piece of program code. The program code is loaded and executed by the processor to implement operations of the artificial intelligence-based image processing method.

According to an aspect of this application, a computer-readable storage medium is provided. The computer-readable storage medium stores at least one piece of program code. The program code is loaded and executed by a processor to implement operations of the artificial intelligence-based image processing method.

BRIEF DESCRIPTION OF THE DRAWINGS

To describe the technical solutions in the embodiments of this application more clearly, the following outlines the drawings used in the embodiments. Evidently, the drawings outlined below are merely a part of embodiments of this application. A person of ordinary skill in the art may derive other drawings from such drawings without making any creative effort.

DESCRIPTION OF EMBODIMENTS

Figure 1:
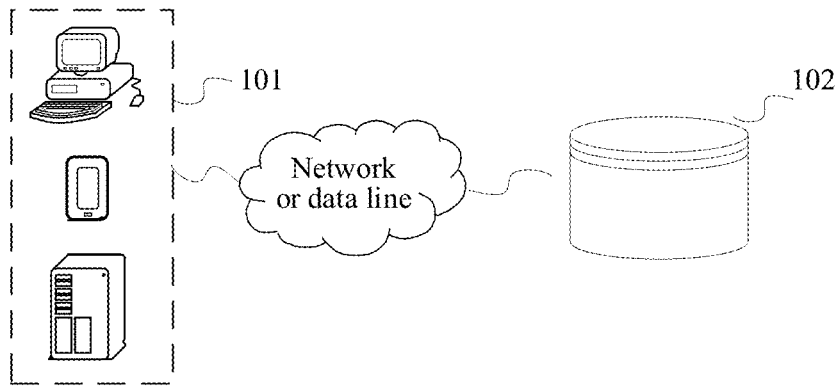
FIG. 1 is a schematic diagram of an environment for implementing an artificial intelligence-based image processing method according to an embodiment of this application.

To make the objectives, technical solutions, and advantages of this application clearer, the following describes the embodiments of this application in more detail with reference to the drawings.

The terms used in this application are described below.

Artificial intelligence (AI) is a theory, method, technology, and application system that uses a digital computer or a computerized machine to simulate, extend, and expand human intelligence to perceive an environment, acquire knowledge, and obtain the best results using the knowledge. In other words, artificial intelligence is a comprehensive technology of the computer science, and is intended to understand the essence of intelligence and produce a new kind of intelligent machine that can respond in a similar way to human intelligence. Artificial intelligence deals with the design principles and implementation methods of various intelligent machines, so that the machines are capable of perceiving, reasoning, and decision-making.

The artificial intelligence technology is a comprehensive discipline that involves a wide range of fields including both hardware technologies and software technologies. Basic technologies of artificial intelligence generally include sensor technology, special-purpose artificial intelligence chips technology, cloud computing technology, distributed storage technology, big data processing technology, operating/interaction system technology, mechatronics technology, and the like. Main artificial intelligence software technologies include computer vision technology, speech processing technology, natural language processing technology, and machine learning/deep learning technology.

The computer vision (CV) technology is a science that deals with how to make a machine "see". Further, computer vision is machine vision that uses a camera and computer instead of human eyes to identify, track, measure, and perform other operations on a target, and further perform graphic processing on results of the identification, tracking, and measurement so that the results of computer processing become images that are more suitable for being observed by human eyes or for being transmitted to an instrument for detection. As a scientific discipline, computer vision deals with related theories and technologies in an attempt to create an artificial intelligence system capable of obtaining information from images or multidimensional data. The computer vision technology generally includes technologies of image processing, image recognition, image semantics understanding, image retrieval, OCR, video processing, video semantics understanding, video content/behavior recognition, three-dimensional object reconstruction, three-dimensional technology, virtual reality, augmented reality, simultaneous localization and mapping, and the like, and also includes common biometric identification technologies such as face recognition and fingerprint recognition. For example, the computer vision technology includes a technology for cutting a medical image, and a technology for locating a lesion in a medical image.

Machine learning (ML) is a multi-field interdisciplinary subject involving a plurality of disciplines such as probability theory, statistics, approximation theory, convex analysis, and algorithm complexity theory. Machine learning is devoted to the study of how a computer simulates or implements human learning behaviors to acquire new knowledge or skills, and to reorganize existing knowledge structures so that the computer keeps improving performance. Machine learning is the core of artificial intelligence, and a fundamental way to impart intelligence to computers. Machine learning is universally applied in all fields of artificial intelligence. Machine learning and deep learning generally include technologies such as artificial neural networks, belief networks, reinforcement learning, transfer learning, inductive learning, and learning from instruction. For example, an image processing model is obtained by training by way of machine learning, and the image processing model processes a medical image. In a specific application scenario, the image processing model may be a labeling model that is used for labeling a target human tissue region (such as a lesion) in the medical image.

With the emergence and progress of the artificial intelligence technology, the artificial intelligence technology has been researched and applied in a plurality of fields. For example, common application fields of artificial intelligence include smart homes, smart wearable devices, virtual assistants, smart speakers, smart marketing, unmanned driving, autonomous driving, unmanned aerial vehicles, robots, smart medical care, smart customer service, and the like. Hopefully, with the development of technology, artificial intelligence will be applied in more fields and exert higher value.

The solutions provided in the embodiments of this application relate to artificial intelligence technologies such as computer vision and machine learning, and specifically relate to the field of smart medical care. The environment and specific manner of implementing the methods disclosed herein are described below using the following embodiments.

FIG. 1 shows an environment for implementing an artificial intelligence-based image processing method according to an embodiment of this application. Referring to FIG. 1, the implementation environment may include a computer device 101 and a database 102. The computer device 101 may exchange data with the database 102 through a wired connection, or may exchange data with the database 102 through a wireless network connection, without being limited herein.

In this embodiment of this application, the computer device 101 may process a slice image. In an implementation, the slice image may be a medical image, that is, a human tissue image. In this case, the artificial intelligence-based image processing method according to this embodiment of this application may be applied to locating a target human tissue, for example, locating a lymph node metastasis region to which cancer cells such as breast cancer, colorectal cancer, and pancreatic cancer have metastasized. Definitely, the method may also be applied to locating other target human tissues, without being limited herein. The artificial intelligence-based image processing method may also be applied to a scenario of locating a target in other images, for example, locating a target in a landscape image.

The database 102 may store slice images. The computer device 101 may extract a slice image from the database 102 and process the slice image. Definitely, after processing the slice image, the computer device 101 may further send the processed slice image carrying label information to the database 102 for storage.

Specifically, the computer device 101 may be a terminal or a server, without being limited herein.

Figure 2:
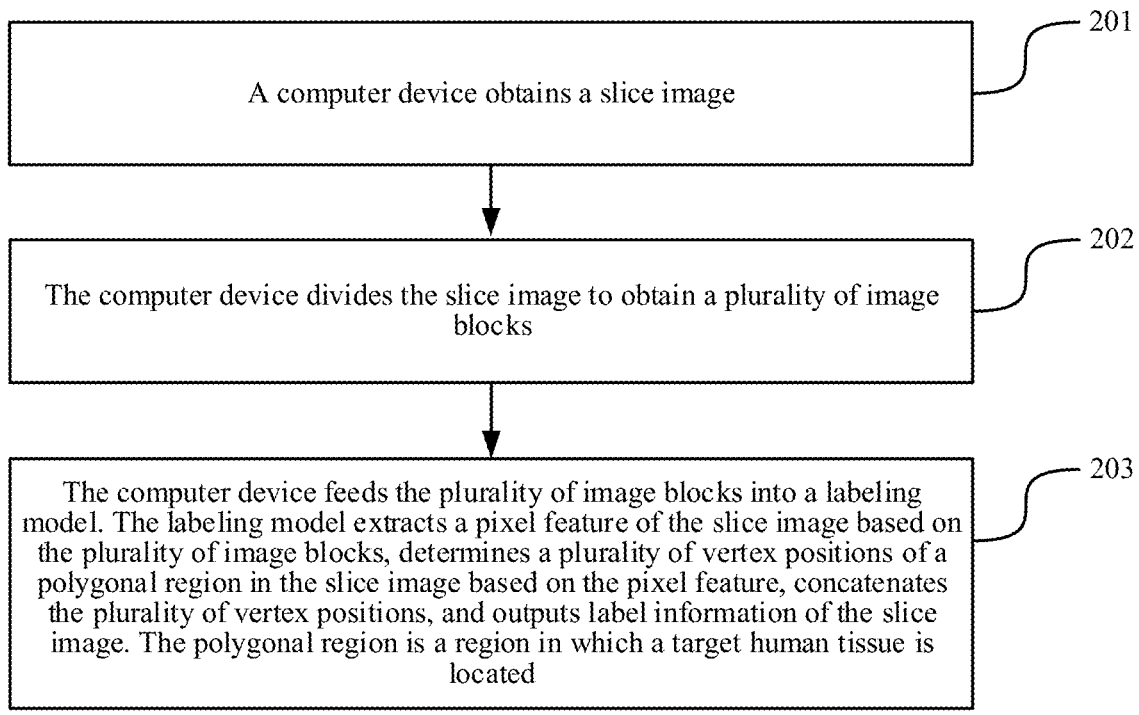
FIG. 2 is a flowchart of a method for training a labeling model according to an embodiment of this application.

FIG. 2 is a flowchart of an artificial intelligence-based image processing method according to an embodiment of this application. In this embodiment, the artificial intelligence-based image processing method may be applied to a computer device. The computer device may be the computer device 101 in the above implementation environment, or may be other computer devices. To be specific, a labeling model may be obtained by training on the computer device 101, or, a labeling model may be obtained by training on another computer device and then processed into a configuration file, and the configuration file is sent to the computer device 101 so that the labeling model is stored in the computer device 101. Definitely, when needing labeling, the computer device 101 may invoke a labeling model that is obtained by training on another computer device, without being limited herein. Referring to FIG. 2, the method may include the following steps 201 to 203:

Step 201: A computer device obtains a slice image.

In this embodiment, the slice image may be an image of a pathological slice. The slice image may be a digital image obtained by scanning a conventional glass pathological slice using an automatic microscope or an optical magnification system. The digital image may be a large-scale high-resolution image. The human tissue in the slice image may be parts such as liver, brain, or lung of the human tissue, or, of course, may be other human tissues. The examples used herein are intended merely as illustrative but not as a limitation on the specific type of the slice image.

In this embodiment of this application, the computer device may process the slice image based on a labeling model, and label the position of a target human tissue region in the slice image. In an implementation, the target human tissue region may be referred to as a lesion. The lesion is region in which a pathological change of an organism is located, that is, a region in which a regional and pathologically changed tissue with pathogenic microorganisms is located. For example, the target human tissue region is a region in which breast cancer cells are located.

Step 202: The computer device cuts the slice image to obtain a plurality of image blocks.

The computer device may cut the slice image, and use the cut-out image blocks as an input to the labeling model. The cut-out image blocks can be directly inputted into the labeling model for labeling, without a need to be labeled manually.

A complete slice image generally includes tens of thousands of pixels. If the entire slice image is labeled manually, the workload is heavy and cumbersome. In this embodiment of this application, after the slice image is cut into image blocks and the image blocks are inputted into the labeling model, prediction can be performed based on the image block without a need to perform pixel-wise prediction, thereby greatly reducing complexity of the prediction and improving processing efficiency.

Step 203: The computer device inputs the plurality of image blocks into a labeling model. The labeling model extracts a pixel feature of the slice image based on the plurality of image blocks, determines a plurality of vertex positions of a polygonal region in the slice image based on the pixel feature, concatenates the plurality of vertex positions, and outputs label information of the slice image. The polygonal region is a region in which a target human tissue is located.

The computer device inputs the plurality of image blocks into the labeling model. The labeling model can predict, based on the plurality of image blocks, a vertex position of a region in which a target human tissue is located. The region in which the target human tissue is located is a polygonal region. With the slice image labeled by a polygon, it is ensured that the edges of the region obtained from the labeling are continuous and the region includes no pores. This labeling method is more accurate than a pixel-wise prediction method.

The labeling model may be a trained model. The labeling model can be obtained by training based on a sample slice image that carries target label information.

In this embodiment of this application, a plurality of cut-out image blocks are directly inputted into the labeling model. The labeling model automatically labels vertex positions of the polygonal region in the slice image, concatenates the vertex positions, and outputs the label information. The polygonal region is determined by labeling the vertex positions of the polygonal region. The determined polygonal region meets the characteristics of the target human tissue region. The characteristics of the target human tissue region are that the edges of the region are continuous and the region includes no pores. Therefore, the image is processed more accurately. Further, complexity of an image processing process is reduced greatly because the slice image does not have to be predicted in a pixel-wise manner. In addition, the labeling process is automatically performed by the labeling model without relying on manually labeled data, thereby greatly reducing labor costs, and effectively increasing the labeling speed, and in turn, improving the efficiency of image processing.

Figure 3:
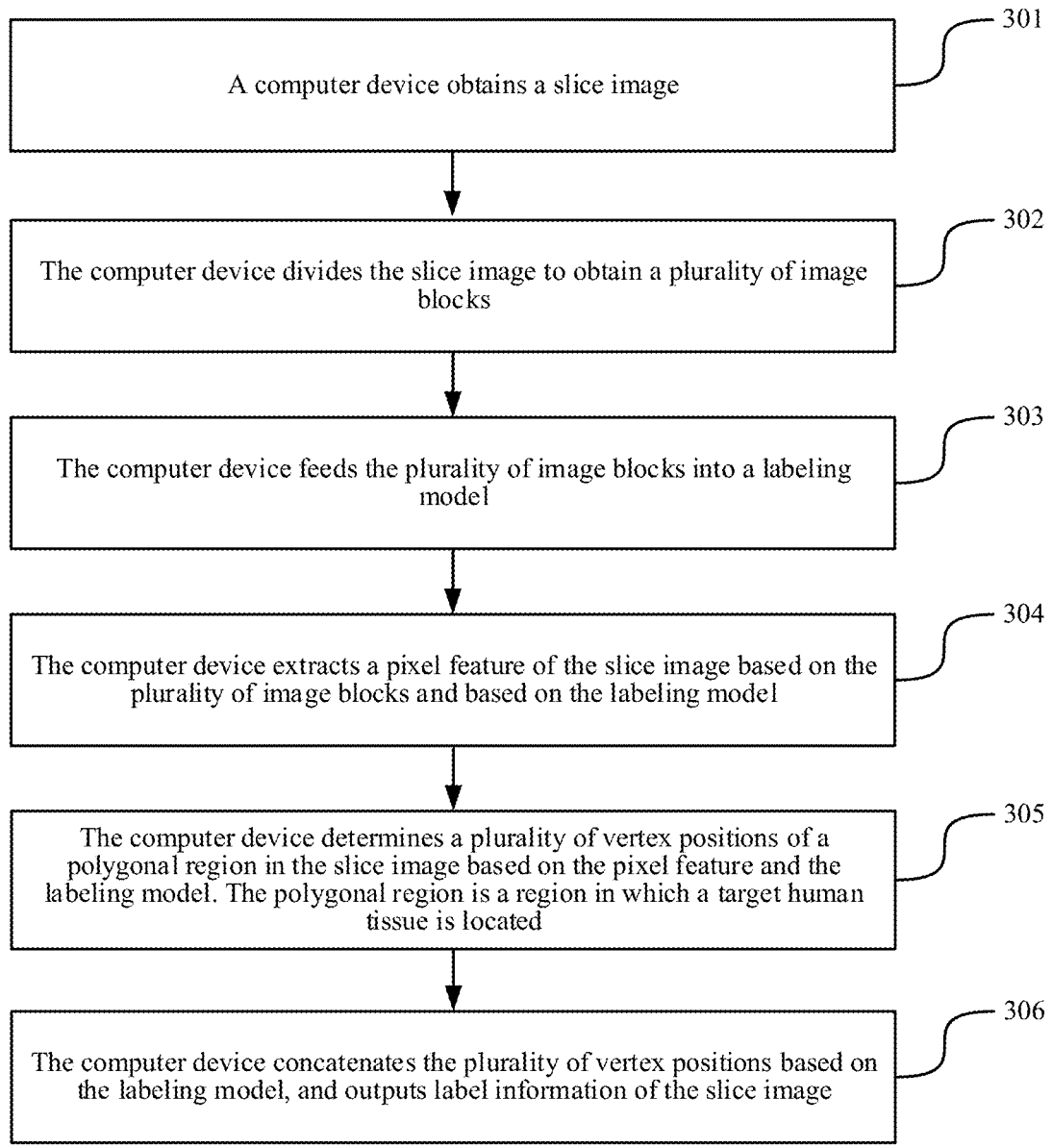
FIG. 3 is a flowchart of an artificial intelligence-based image processing method according to an embodiment of this application.

FIG. 3 is a flowchart of an artificial intelligence-based image processing method according to an embodiment of this application. Referring to FIG. 3, the method may include the following steps 301 to 306:

Step 301: A computer device obtains a slice image.

In an implementation, the slice image may be stored in an image database. The computer device can extract the slice image from the image database. In another implementation, the slice image may be obtained by collecting by the computer device or another computer device, and then the slice image is processed by the computer device. The number of the slice images may be one or plural, without being limited herein.

Step 302: The computer device cuts the slice image to obtain a plurality of image blocks.

The computer device cuts the slice image into a plurality of image blocks that are smaller in size, thereby avoiding the need to perform pixel-wise prediction on the entire slice image, and reducing the prediction complexity.

In an implementation, the computer device may cut the slice image into a plurality of image blocks of equal sizes. Specifically, the computer device may cut the slice image based on a target size to obtain a plurality of image blocks of the target size. In this way, the image blocks are of the same size, and may be processed in a same manner, thereby reducing calculation difficulty of the computer device and improving the processing efficiency.

The target size may be set as required for image processing, and is not limited herein.

Step 303: The computer device inputs the plurality of image blocks into a labeling model.

The labeling model may be a trained model. A training process may include the following steps (1) to (3). The training process may be performed on said computer device or on another computer device, without being limited herein.

Step (1): Obtain a plurality of sample slice images. The sample slice images carry target label information.

The plurality of sample slice images may be stored in an image database. The computer device can extract the sample slice images from the image database to perform model training.

The target label information is used for indicating real labeling status of the sample slice image. Based on the target label information, accuracy of the label information predicted by the model can be determined, and then it is determined whether the model parameters need to be adjusted to improve the prediction accuracy of the model.

Step (2): Input the plurality of sample slice images into an initial labeling model, and predict, by the initial labeling model, label information in the plurality of sample slice images to obtain predicted label information.

Values of the model parameters in the initial labeling model are initial values. The computer device may use the plurality of sample slice images as training samples and validation samples to train the initial labeling model. To be specific, the computer device may adjust model parameters of the initial labeling model using the sample slice images, so that the model parameters that have been adjusted for several times can accurately predict the slice image and output more accurate label information.

Specifically, the computer device inputs the plurality of sample slice images into the initial labeling model. The initial labeling model may predict each sample slice image. Based on the prediction result and the target label information, prediction capabilities of the initial labeling model are determined. In this way, by adjusting the model parameters of the initial labeling model, the prediction capabilities of the initial labeling model can be improved continuously. Therefore, the labeling model that is subsequently obtained by training can perform labeling accurately.

Step (3): Adjust model parameters of the initial labeling model based on the predicted label information and the target label information until a target condition is met, so as to obtain the labeling model.

The accuracy of the predicted label information can be obtained based on the predicted label information and the target label information. The model parameters are adjusted based on the accuracy. The target condition may be: the accuracy has converged, or the number of iterations reaches a target number of times, or the like, without being limited herein.

In an implementation, the initial labeling model may process a sample slice images in the following process: The initial labeling model extracts a pixel feature of the sample slice image based on the plurality of image blocks, determines a plurality of vertex positions of a polygonal region in the sample slice image based on the pixel feature, concatenates the plurality of vertex positions, and outputs predicted label information of the sample slice image. The polygonal region is a region in which a target human tissue is located.

Figure 4:
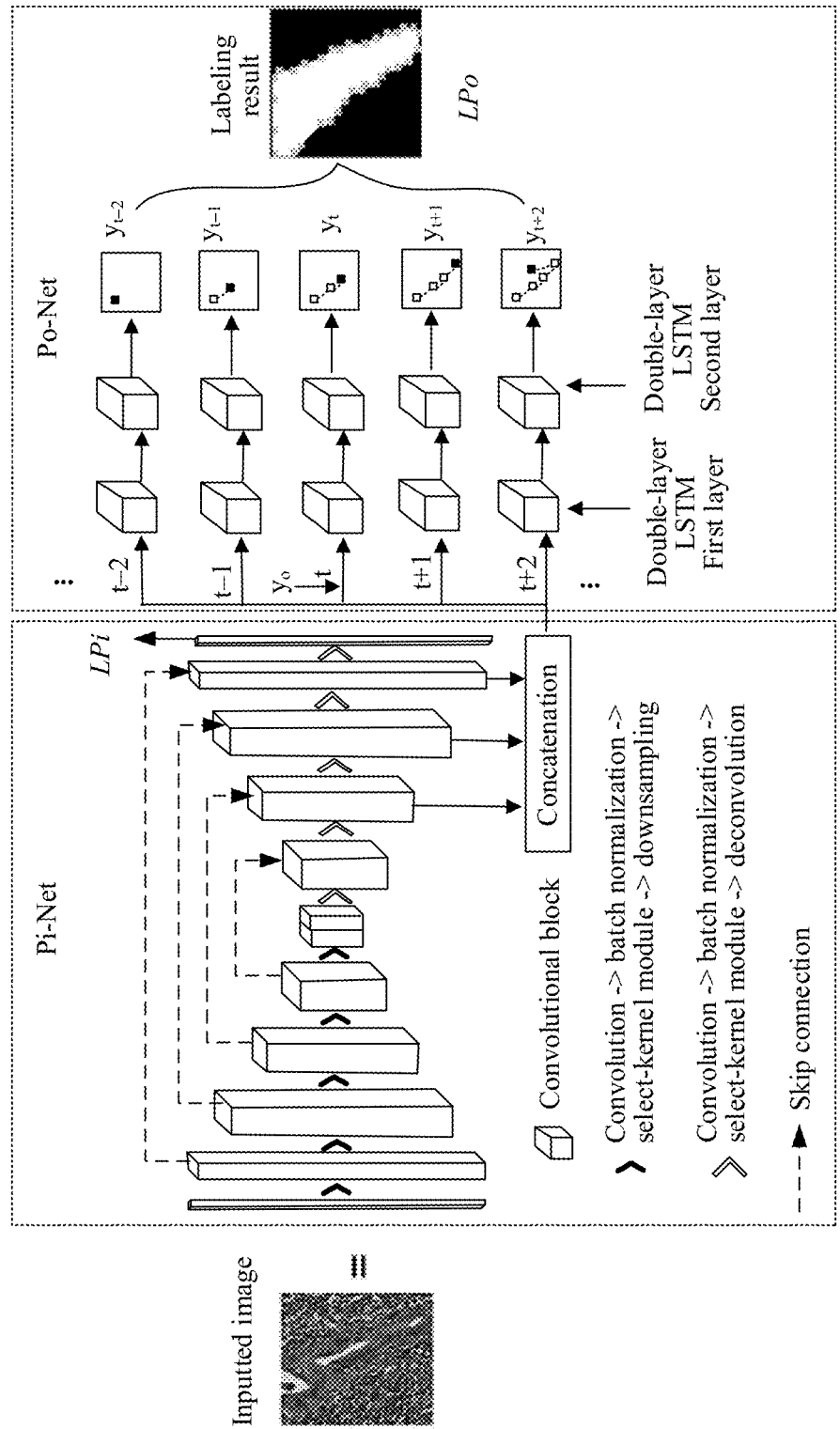
FIG. 4 is a schematic structural diagram of a labeling model according to embodiment of this application.

In an implementation, a structure the initial labeling model and a structure of the labeling model may include a feature extraction module and a prediction module. The feature extraction module is configured to perform a feature extraction step. The prediction module is configured to perform a prediction step. For example, FIG. 4 shows a structure of an initial labeling model and a structure of a labeling model, in which a feature extraction module may be referred to as a Pi-Net module, and the prediction module may be referred to as a Po-Net module.

In an implementation, the pixel feature may be a segmentation mask, and the Pi-Net module can generate a pixel-level segmentation mask for an inputted image. This Pi-Net module can perform an encoding process and a decoding process to generate a segmentation mask. A process of obtaining the pixel feature may be as follows: the computer device encodes the plurality of image blocks based on pixel values of the plurality of image blocks, so as to obtain features of the plurality of image blocks, decodes the features obtained from the encoding, so as to obtain a segmentation mask of the sample slice image (that is, the pixel feature of the sample slice image).

In a specific embodiment, the Pi-Net module may include an encoder and a decoder. The encoder is configured to perform the encoding process, and the decoder is configured to perform the decoding process.

In an implementation, both the encoding process and the decoding process may be implemented based on a plurality of convolutional layers. The plurality of convolutional layers of the encoder may be referred to as first convolutional layers, and the plurality of convolutional layers of the decoder may be referred to as second convolutional layers.

Correspondingly, the encoding process may be as follows: the computer device may perform a convolution operation on adjacent image blocks in the plurality of image blocks based on a plurality of first convolutional layers, perform batch normalization on first features obtained from the operation, and perform downsampling on second features based on selection parameters in model parameters by using a convolution kernel corresponding to the selection parameters, so as to obtain the features of the plurality of image blocks, where the second features are obtained from the batch normalization. The batch normalization is a technique for deep neural network training, and specifically, is a process of normalizing a batch of data, for example, normalizing a batch of data inputted to a neural network or a batch of data outputted from a layer in the neural network. The batch normalization can not only accelerate convergence of the model, but also alleviate a "gradient diffusion" problem in a deep-layer network to some extent, thereby enabling easier and more stable training of a deep-layer network model.

The decoding process may be as follows: The computer device may perform a convolution operation on features of adjacent image blocks in the plurality of image blocks based on a plurality of second convolutional layers, perform batch normalization on third features obtained from the operation, and perform a deconvolution operation on fourth features based on selection parameters in model parameters by using a convolution kernel corresponding to the selection parameters, so as to obtain segmentation masks of the sample slice image, where the fourth features are obtained from the batch normalization.

A lower layer of the encoder can extract low-level features (such as texture and edges) of the sample slice image. A higher layer of the encoder can extract high-level features (such as shape) of the sample slice image. The decoder is configured to perform a deconvolution operation on the extracted features to restore the segmentation mask (that is, pixel feature) of the same size as the original input.

For the encoding process, operations of "convolution-≥batch normalization-≥select-kernel module-≥downsampling" are introduced between adjacent blocks to halve the size of a feature map and double the number of feature channels. For the decoding process, operations of "convolution-≥batch normalization≥select-kernel module-≥deconvolution" are introduced between adjacent blocks to double the size of the feature map and halve the number of feature channels, thereby implementing the process of restoring the segmentation masks of the same size as the original input.

Parameters of the select-kernel module is the selection parameters. The selection parameters are used for selecting different convolution kernels. The selection parameters can be obtained by learning during the model training. To be specific, in step (3) above, the selection parameters can also be adjusted during adjustment of the model parameter. In this way, during the model training, an appropriate convolution kernel is dynamically learned for a purpose of prediction, thereby improving the feature extraction capabilities of the model, and in turn, improving the labeling capabilities. This learning process enables dynamic learning of feature representations of different convolution kernels (such as 3×3, 5×5, and 7×7), greatly enriches a receptive field, and helps the model to extract features more efficiently. The receptive field is a region of a pixel mapped onto an inputted image, where the pixel is a pixel on a feature map outputted by each layer of a convolutional neural network. That is, the receptive field is a region on the inputted image, where the region corresponds to a point on the feature map.

In an implementation, a skip connection may be established between the encoding process and the decoding process. That is, a skip connection may be established between a first convolutional layer and a second convolutional layer. When each second convolutional layer processes an output of a previous second convolutional layer, an output result of the first convolutional layer (a convolutional layer used in encoding) can be considered, so as to ensure that details of the image can be transmitted to the encoder more effectively, so as to locate the polygonal region (also referred to as a region of interest) more efficiently.

Specifically, in the decoding process, for each second convolutional layer, based on a feature outputted by a first convolutional layer corresponding to the second convolutional layer, the computer device decodes a feature outputted by a previous second convolutional layer prior to the second convolutional layer to obtain an output of the second convolutional layer. A plurality of second convolutional layers are adjacent to each other. The features outputted by the plurality of second convolutional layers are concatenated to obtain segmentation masks of the sample slice image.

In this embodiment, the Po-Net module may be a two-layer convolutional long short-term memory (ConvLSTM) model. Specifically, the computer device may perform a convolution operation on the pixel feature based on the two-layer convolutional long short-term memory ConvLSTM model to obtain the plurality of vertex positions of the polygonal region in the slice image.

The long short-term memory (LSTM) model is a time recurrent neural network, and is applicable to solving a long-term dependence problem of a general recurrent neural network (RNN), and can process an image sequence effectively. The plurality of image blocks are an image block sequence. Through recurrent prediction, the vertex positions are predicted one by one to obtain ultimate label information. Compared with LSTM, the ConvLSTM uses the convolution operation instead of matrix multiplication, thereby significantly reducing training parameters and improving operating efficiency.

Specifically, target grid cells may be used to correspond to vertices, and pixel features of the target grid cells are used as the vertex positions. In this way, in the foregoing prediction process, the pixel features may be inputted into the two-layer ConvLSTM model. The two-layer ConvLSTM model performs a convolution operation on pixel features of surrounding grid cells of a plurality of target grid cells, encodes a result of the convolution operation to obtain pixel features of the target grid cells, and uses the pixel features of the plurality of target grid cells as the plurality of vertex positions of the polygonal region in the slice image.

The target grid cells may be set as required for image processing, without being limited herein. The result of the convolution operation may be encoded by any encoding method. One-hot encoding is used as an example of the encoding method herein. For example, an output of each ConvLSTM step above is a grid cell of a 28×28 size. The one-hot encoding causes a grid cell to correspond to a spatial position of a vertex (that is, a vertex position) in the polygon region. One-hot encoding, also known as one-bit effective encoding, uses an N-bit status register to encode N states. Each state has its own independent register bit, and only one bit is valid at any time.

Specifically, the two-layer ConvLSTM model may implement a prediction process in the following way, and predict the vertex positions one by one through recurrent predictions. The computer device may input the pixel feature into the two-layer ConvLSTM model. The two-layer ConvLSTM model performs a convolution operation on pixel features of surrounding grid cells of a first target grid cell, encodes a result of the convolution operation to obtain a pixel feature of the first target grid cell, and uses the pixel feature of the target grid cell as a first vertex position. The computer device may perform a convolution operation on pixel features of surrounding grid cells of a second target grid cell based on the pixel feature and the first vertex position and based on the ConvLSTM model, then encode a result of the convolution operation to obtain a pixel feature of the second target grid cell, and use the pixel feature of the second target grid cell as a second vertex position. The computer device continues to perform convolution operations and encoding based on the pixel feature, the first vertex position, and the second vertex position until all vertex positions of the polygonal region are obtained.

For example, as shown in FIG. 4, the input of the Po-Net module in step t may include three parts: a concatenation feature map (extracted pixel feature) outputted by the Pi-Net module, predicted vertices $y(t-1)$ and $y(t-2)$, and an initial vertex $y0$.

In an implementation, during model training, in predicting a next vertex position based on first two vertex positions, the first two vertex positions in the target label information may be used for predicting the next vertex position. In this way, the prediction is based on real label information, thereby improving the labeling accuracy of the prediction module. Specifically, the initial model may determine that the first two vertex positions in the target label information are first two vertex positions in the sample slice image, and predict a next vertex position based on the first two vertex positions and the sample slice image, so as to obtain the predicted label information.

For example, as shown in FIG. 4, for the prediction at step t, the first two vertex positions $y(t-1)$ and $y(t-2)$, which are real polygon labels rather than predicted labels, serve to predict the next vertex position $y(t)$, thereby enabling the ConvLSTM to improve the labeling accuracy. During an inference process of the model, one vertex of the polygon label is generated in each ConvLSTM step. The vertices are concatenated sequentially to obtain an ultimate label result.

In an implementation, in the above training process, the accuracy of the prediction process may be measured by one or more loss values, and specifically, may be measured by at least one of a prediction loss value, a segmentation loss value, or a constraint loss value.

Therefore, in step (3) above, the computer device may perform at least one of: (i) obtaining the prediction loss value based on the predicted label information and the target label information; (ii) obtaining the segmentation loss value based on a predicted pixel feature and a target pixel feature of the sample slice image; or (iii) obtaining the constraint loss value between the predicted pixel feature and the predicted label information, and then adjust model parameters of the initial labeling model based on the at least one loss value obtained.

For the three loss values, the prediction loss value may be $L_{p_o}$, the segmentation loss value may be $L_{p_i}$, and a constraint loss function may be $L_{Cons}$. The three loss values may be obtained by the following Formula (1) Formula (3):

The segmentation loss value $L_{p_i}$ is a measure of a difference between a segmentation mask of a predicted polygonal region (a target human tissue region, such as a cancer metastasis region) and a real pixel-level segmentation mask.

$$Lp_i = -\sum_i q_i \log(p_i) + \left(1 - \frac{2\sum_i p_i q_i + \varepsilon}{\sum_i p_i + \sum_i q_i + \varepsilon}\right), \quad (1)$$

In the formula above, $p_i$ represents a probability that a pixel i is classed as a polygonal region, $q_i \in \{0, 1\}$ represents the target label information (real segmentation mask) of the pixel i, and $\varepsilon$ is a very small positive number that is used for improving numerical stability. $\Sigma$ is an accumulation function or a summation function.

In Formula (1), $L_{p_i}$ may include a binary cross-entropy loss function and a dice loss function. In this way, when a lesion locating process is regarded as a vertex prediction process, an area constraint can also be considered. The area constraint is an intersection over union (IoU) score between the real segmentation mask and the predicted polygon. The $L_{p_i}$ includes a dice loss function. The IoU score can be improved by optimizing $L_{p_i}$, so as to improve labeling quality.

The prediction loss value $L_{p_o}$ is a measure of a difference between a predicted polygon and a real polygon. Each predicted polygon vertex is one-hot encoded in each ConvLSTM step. The vertex prediction process may be regarded as a classification task to identify whether a pixel is a target human tissue, that is, whether the pixel is a point in the polygonal region. The following Formula (2) optimizes $L_{p_o}$ by using a binary cross-entropy loss.

$$Lp_o = -\Sigma_t n^t \log(m^t), \quad \text{Formula (2)}$$

In the formula above, $m^t$ represents a predicted position of a polygon vertex in step t, and $n^t$ is a real position of the vertex.

The constraint loss function $L_{Cons}$ is used for constraining an output result of the Pi-Net module and the Po-Net module, and may be expressed by the following Formula (3):

$$L_{Cons} = -\Sigma_c |x_c - y_c|, \quad \text{Formula (3)}$$

In the formula above, $x_c$ represents a probability that a pixel generated by the Pi-Net module is a polygonal region, $y_c=1$ means that the pixel c is located inside a region defined by a polygonal label box generated by the Po-Net module, that is, located inside the polygonal region. In Formula (3), the L1 loss is adopted so that the outputs of the two modules keep consistent. In this way, the two modules can assist each other to learn features, thereby further improving the accuracy of labeling.

Step 304: The computer device extracts a pixel feature of the slice image based on the plurality of image blocks and based on the labeling model.

This step 304 is similar to the feature extraction process shown in step 303. The labeling model may include a feature extraction module and a prediction module. The feature extraction module is configured to perform step 304. The prediction module is configured to perform the following step 305. Similar to the feature extraction steps in the model training process described above, the steps performed by the two modules are to process a plurality of image blocks. The steps are described briefly here without going into details.

In an implementation, the pixel feature may be a segmentation mask, and accordingly, step 304 may be: The computer device encodes the plurality of image blocks based on pixel values of the plurality of image blocks, so as to obtain features of the plurality of image blocks, decodes the features obtained from the encoding, so as to obtain segmentation masks of the slice image.

Both the encoding process and the decoding process may be implemented based on a plurality of convolutional layers. The encoding process may be as follows: the computer device may perform a convolution operation on adjacent image blocks in the plurality of image blocks based on a plurality of first convolutional layers, perform batch normalization on first features obtained from the operation, and perform downsampling on second features based on selection parameters in model parameters by using a convolution kernel corresponding to the selection parameters, so as to obtain the features of the plurality of image blocks, where the second features are obtained from the batch normalization.

Accordingly, the decoding process may be as follows: the computer device may perform a convolution operation on features of adjacent image blocks in the plurality of image blocks based on a plurality of second convolutional layers, perform batch normalization on third features obtained from the operation, and perform a deconvolution operation on fourth features based on selection parameters in model parameters by using a convolution kernel corresponding to the selection parameters, so as to obtain segmentation masks of the slice image, where the fourth features are obtained from the batch normalization.

In an implementation, a skip connection may be established between the encoding process and the decoding process. That is, a skip connection may be established between a first convolutional layer and a second convolutional layer. When each second convolutional layer processes an output of a previous second convolutional layer, an output result of the first convolutional layer (a convolutional layer used in encoding) can be considered, so as to ensure that details of the image can be transmitted to the encoder more effectively, so as to locate the polygonal region (also referred to as a region of interest) more efficiently.

Specifically, in the decoding process, for each second convolutional layer, based on a feature outputted by a first convolutional layer corresponding to the second convolutional layer, the computer device decodes a feature outputted by a previous second convolutional layer prior to the second convolutional layer to obtain an output of the second convolutional layer. A plurality of second convolutional layers are adjacent to each other. The features outputted by the plurality of second convolutional layers are concatenated to obtain segmentation masks of the slice image.

Step 305: The computer device determines a plurality of vertex positions of a polygonal region in the slice image based on the pixel feature and the labeling model. The polygonal region is a region in which a target human tissue is located.

After extracting the pixel feature, the computer device may predict the vertex positions. After the vertex positions are obtained, the polygonal region can be determined by concatenating the vertex positions.

In an implementation, the prediction process may be implemented by a two-layer convolutional long short-term memory (ConvLSTM) model. Specifically, the computer device may perform a convolution operation on the pixel feature based on the two-layer convolutional long short-term memory ConvLSTM model to obtain the plurality of vertex positions of the polygonal region in the slice image.

Specifically, target grid cells may be used to correspond to vertices, and pixel features of the target grid cells are used as the vertex positions. In this way, in the foregoing prediction process, the pixel features may be inputted into the two-layer ConvLSTM model. The two-layer ConvLSTM model performs a convolution operation on pixel features of surrounding grid cells of a plurality of target grid cells, encodes a result of the convolution operation to obtain pixel features of the target grid cells, and uses the pixel features of the plurality of target grid cells as the plurality of vertex positions of the polygonal region in the slice image.

Specifically, the two-layer ConvLSTM model may implement a prediction process in the following way. The computer device may input the pixel feature into the two-layer ConvLSTM model. The two-layer ConvLSTM model performs a convolution operation on pixel features of surrounding grid cells of a first target grid cell, encodes a result of the convolution operation to obtain a pixel feature of the first target grid cell, and uses the pixel feature of the target grid cell as a first vertex position. The computer device may perform a convolution operation on pixel features of surrounding grid cells of a second target grid cell based on the pixel feature and the first vertex position and based on the ConvLSTM model, then encode a result of the convolution operation to obtain a pixel feature of the second target grid cell, and use the pixel feature of the second target grid cell as a second vertex position. The computer device continues to perform convolution operations and encoding based on the pixel feature, the first vertex position, and the second vertex position until all vertex positions of the polygonal region are obtained.

Step 305 is similar to the prediction step in the model training process in step 303 described above, and details are omitted herein.

Step 306: The computer device concatenates the plurality of vertex positions based on the labeling model, and outputs label information of the slice image.

Step 306 is similar to the corresponding steps of concatenation and outputting in the model training process shown in step 303 above, and details are omitted herein.

In an implementation, the computer device may further display the label information of the slice image. If the label information is not accurate enough and needs to be corrected, a user can perform a correction operation on the label information. Upon detecting the correction operation, the computer device may correct the label information of the slice image in response to the correction operation on the label information of the slice image and based on the correction operation. The computer device may further re-input the corrected label information into the labeling model. The labeling model performs re-labeling to obtain more accurate label information. Specifically, the computer device may input the corrected label information into the labeling model. The labeling model re-labels the plurality of vertex positions of the polygonal region in the slice image based on the corrected label information, so as to obtain label information.

The computer device treats the labeling process as a polygon vertex prediction task. A polygon usually includes a series of vertices concatenated in sequence. Complexity of predicting the polygon vertices is much lower than complexity of pixel-wise mask prediction. Therefore, predicting boundaries of a polygonal region (such as a cancer metastasis region) is easier, and is at a lower risk of introducing noise. Further, polygon-based prediction enables human-computer interaction. Specifically, if the resulting polygon is incorrect or the edges of the polygon are self-intersecting, a person who performs manual labeling can easily adjust the vertices of the polygon (by dragging the incorrectly predicted vertices to correct positions). The manually corrected new polygon may be inputted into an algorithm to iterate until the best label result is obtained.

The labeling model according to an embodiment of this application is compared with an existing polygon recurrent neural network (polygon-RNN) below by using an example.

The labeling model and the polygon-RNN are tested by using a Camelyon16 dataset. Camelyon16 is a dataset that includes 158 pathological slices (that is, slice images), of which 110 slices are a training set, 24 slices are a validation set, and 24 slices are a test set. All slices (that is, slice images) are cropped into 224×224 (that is, a target size) small images (that is, image blocks) at 10× magnification. The small images are used as input to the model. To alleviate the problem of data imbalance, 1000 small images may be randomly sampled from the pathological slices. If the number of small images obtained from the cropping is greater than 1000, only the small images that each include only one instance are retained.

In this example, performance indicators for evaluating the two models are sensitivity, precision, dice score, and IoU score. In all experiments, the model was trained by using a batch size of 8 and an Adam optimizer. An initial learning rate is set to 1e-4. The learning rate decreases by a factor of 10 after 10 training epochs. A training process may include 20 training epochs. Both of the above models may be implemented based on a PyTorch framework. The configuration environment may adopt an NVIDIA Tesla P40 GPU card with a 24 GB internal memory. The description above is merely exemplary, and does not limit the model training and the configuration. Table 1 shows results of performance comparison between a two-model algorithm and an algorithm that combines a plurality of models according to this application.

TABLE 1

| No. | Model | Sensitivity | Precision | Dice score | IoU score |
|---|---|---|---|---|---|
| 1 | Polygon-RNN | 0.84 | 0.90 | 0.83 | 0.78 |
| 2 | PiPo-Net w/skmUNet | 0.93 | 0.90 | 0.90 | 0.84 |
| 3 | PiPo-Net w/ skmUNet + $L_{pi}$ | 0.94 | 0.91 | 0.91 | 0.85 |
| 4 | PiPo-Net w/ skmUNet + $L_{pi}$ + $L_{Cons}$ | 0.94 | 0.91 | 0.91 | 0.86 |

As shown in Table 1, the models in the 1$^{st}$ row and the 2$^{nd}$ row are trained by using L$_{p_o}$, and differ in the feature extraction module.

Polygon-RNN (the first row) uses Visual Geometry Group-16 (VGG-16) as a feature extractor. SkmUNet represents a UNet in which a select-kernel module (SKM) is embedded. UNet is a deep learning segmentation network. SKM is a schema matching model based on a schema structure and known matching knowledge, and is an acronym of select-kernel module. The significant increase in the dice score and the IoU score according to this embodiment of this application indicates that the feature extraction module provided herein can extract features more effectively, thereby improving model performance. A purpose of L$_{p_o}$ is to measure the difference between predicted polygon vertices and real vertices. Therefore, the optimization of L$_{p_o}$ considers merely an outline/boundary of the polygon, and ignores information on an interior region of the polygon. Based on this, L$_{p_i}$ is introduced to provide more supervision information (model 2 versus model 3). L$_{p_i}$ used for implementing a pixel-wise segmentation task and L$_{p_o}$ used for implementing a polygon-based labeling task cooperate with each other to perform optimization jointly to enable the feature extraction module to learn features shared by two tasks. If the entire network uses L$_{p_o}$ alone for training, overfitting may occur.

The purpose of introducing L$_{Cons}$ is to keep consistency of outputs between the two tasks (model 3 versus model 4) because in ideal circumstances, a prediction result of Pi-Net is the same as a prediction result of Po-Net. Minimizing L$_{Cons}$ makes the two tasks constrain each other. Pi-Net can assist Po-Net in predicting, thereby improving the accuracy of labeling results. Comparison between the method according to this embodiment of this application and a pixel-wise segmentation method (that is, Pi-Net) shows the following evaluation results: dice score 0.89, and IoU score 0.84. Compared with the pixel-wise segmentation method, the model according to this embodiment of this application increases the dice score and the IoU score by 2.25% and 2.38% respectively, thereby achieving high-quality initial labeling results.

Figure 5:
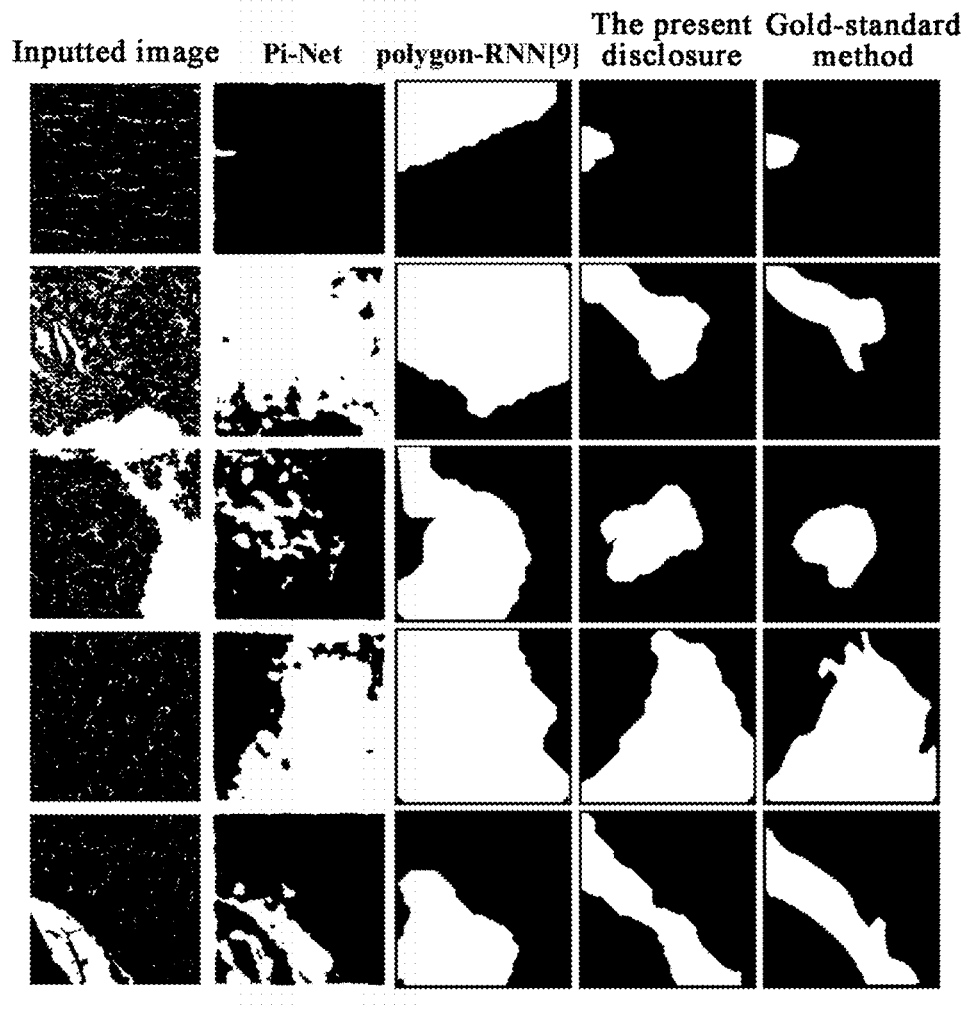
FIG. 5 is a schematic diagram of an image labeling comparison result according to an embodiment of this application.
Figure 6:
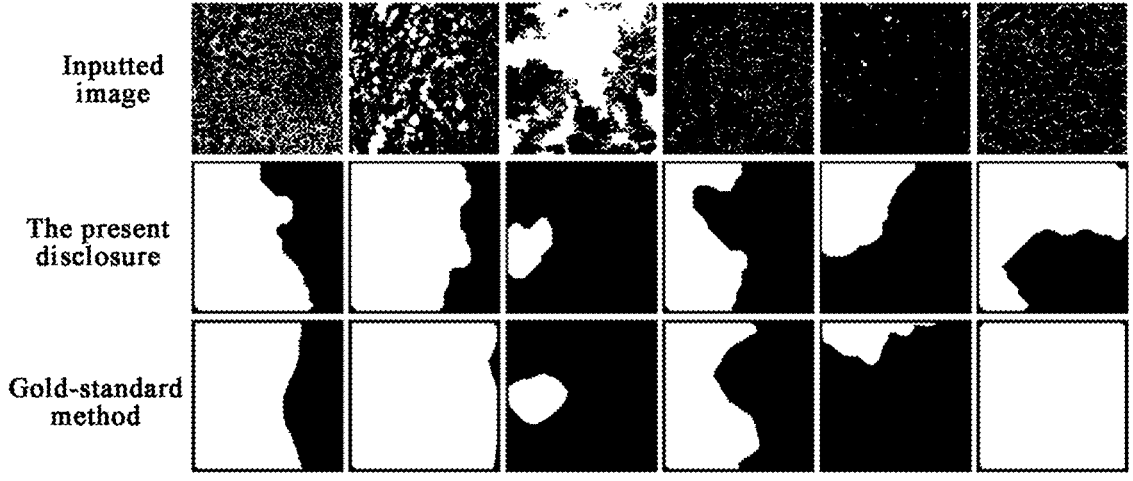
FIG. 6 is a schematic diagram of another image labeling comparison result according to an embodiment of this application.

FIG. 5 shows a result of comparison of label information obtained after an image is processed by a plurality of algorithms. As shown in FIG. 6, a labeling result generated by the method according to this embodiment of this application is sometimes more accurate than what is labeled by a pathologist. Moreover, the method according to this embodiment of this application can save labeling cost massively.

In this embodiment of this application, a plurality of cut-out image blocks are directly inputted into the labeling model. The labeling model automatically labels vertex positions of the polygonal region in the slice image, concatenates the vertex positions, and outputs the label information. The polygonal region is determined by labeling the vertex positions of the polygonal region. The determined polygonal region meets the characteristics of the target human tissue region. The characteristics of the target human tissue region are that the edges of the region are continuous and the region includes no pores. Therefore, the image is processed more accurately. Further, complexity of an image processing process is reduced greatly because the slice image does not have to be predicted in a pixel-wise manner. In addition, the labeling process is automatically performed by the labeling model without relying on manually labeled data, thereby greatly reducing labor costs, and effectively increasing the labeling speed, and in turn, improving the efficiency of image processing.

All the technical solutions described above may be combined arbitrarily to form an embodiment of this application, the details of which are omitted herein.

Figure 7:
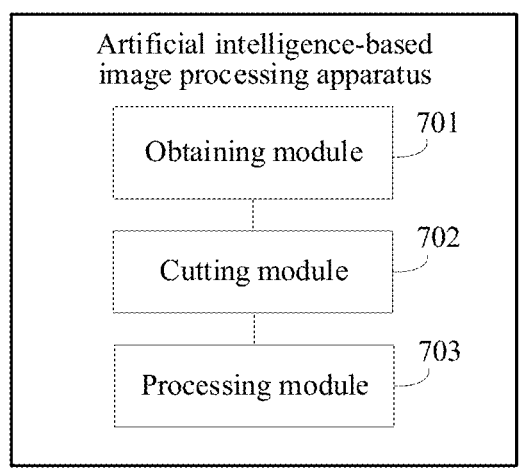
FIG. 7 is a schematic structural diagram of an artificial intelligence-based image processing apparatus according to an embodiment of this application.

FIG. 7 is a schematic structural diagram of an artificial intelligence-based image processing apparatus according to an embodiment of this application. Referring to FIG. 7, the apparatus includes:

an obtaining module 701, configured to obtain a slice image;

a cutting module 702, configured to cut the slice image to obtain a plurality of image blocks; and a processing module 703, configured to input the plurality of image blocks into a labeling model, so that the labeling model extracts a pixel feature of the slice image based on the plurality of image blocks, determines a plurality of vertex positions of a polygonal region in the slice image based on the pixel feature, concatenates the plurality of vertex positions, and outputs label information of the slice image. The polygonal region is a region in which a target human tissue is located.

In an implementation, the pixel feature is a segmentation mask.

The processing module 703 includes an encoding unit and a decoding unit.

The encoding unit is configured to encode the plurality of image blocks based on pixel values of the plurality of image blocks to obtain features of the plurality of image blocks.

The decoding unit is configured to decode the features obtained from the encoding, so as to obtain the segmentation mask of the slice image.

In an implementation, the extraction of the pixel feature of the slice image is implemented based on a plurality of convolutional layers.

The encoding unit is configured to: perform a convolution operation on adjacent image blocks in the plurality of image blocks based on a plurality of first convolutional layers, perform batch normalization on first features obtained from the operation, and perform downsampling on second features based on selection parameters in model parameters by using a convolution kernel corresponding to the selection parameters, so as to obtain the features of the plurality of image blocks, where the second features are obtained from the batch normalization.

In an implementation, the decoding unit is configured to: perform a convolution operation on features of adjacent image blocks in the plurality of image blocks based on a plurality of second convolutional layers, perform batch normalization on third features obtained from the operation, and perform a deconvolution operation on fourth features based on selection parameters in model parameters by using a convolution kernel corresponding to the selection parameters, so as to obtain segmentation masks of the slice image, where the fourth features are obtained from the batch normalization.

In an implementation, the decoding unit is configured to: for each second convolutional layer, based on a feature outputted by a first convolutional layer corresponding to the second convolutional layer, decode a feature outputted by a previous second convolutional layer prior to the second convolutional layer to obtain an output of the second convolutional layer. A plurality of second convolutional layers are adjacent to each other. The features outputted by the plurality of second convolutional layers are concatenated to obtain segmentation masks of the slice image.

In an implementation, the processing module 703 includes a vertex determining unit. The vertex determining unit is configured to perform a convolution operation on the pixel feature based on a two-layer convolutional long short-term memory ConvLSTM model to obtain the plurality of vertex positions of the polygonal region in the slice image.

In an implementation, the vertex determining unit is configured to input the pixel feature into the two-layer ConvLSTM model, so that the two-layer ConvLSTM model performs a convolution operation on pixel features of surrounding grid cells of a plurality of target grid cells, encodes a result of the convolution operation to obtain pixel features of the target grid cells, and uses the pixel features of the plurality of target grid cells as the plurality of vertex positions of the polygonal region in the slice image.

In an implementation, the vertex determining unit is configured to: input the pixel feature into the two-layer ConvLSTM model, so that the two-layer ConvLSTM model performs a convolution operation on pixel features of surrounding grid cells of a first target grid cell, encodes a result of the convolution operation to obtain a pixel feature of the first target grid cell, and uses the pixel feature of the target grid cell as a first vertex position; perform a convolution operation on pixel features of surrounding grid cells of a second target grid cell based on the pixel feature and the first vertex position and based on the ConvLSTM model, encode a result of the convolution operation to obtain a pixel feature of the second target grid cell, and use the pixel feature of the second target grid cell as a second vertex position; and, continue to perform convolution operations and encoding based on the pixel feature, the first vertex position, and the second vertex position until the plurality of vertex positions of the polygonal region are obtained.

In an implementation, a process of training the labeling model includes:
  obtaining a plurality of sample slice images, the sample slice images carrying target label information;
  inputting the plurality of sample slice images into an initial labeling model, and predicting, by the initial labeling model, label information in the plurality of sample slice images to obtain predicted label information; and
  adjusting model parameters of the initial labeling model based on the predicted label information and the target label information until a target condition is met, so as to obtain the labeling model.

In an implementation, the predicting, by the initial labeling model, label information in the plurality of sample slice images to obtain predicted label information, includes:
  determining, by the initial labeling model, the first two vertex positions in the target label information as the first two vertex positions in the sample slice image; and
  predicting a next vertex position based on the first two vertex positions and the sample slice image to obtain the predicted label information.

In an implementation, the adjusting model parameters of the initial labeling model based on the predicted label information and the target label information includes:
  performing at least one of: (i) obtaining a prediction loss value based on the predicted label information and the target label information; (ii) obtaining a segmentation loss value based on a predicted pixel feature and a target pixel feature of the sample slice image; or (iii) obtaining a constraint loss value between the predicted pixel feature and the predicted label information; and
  adjusting the model parameters of the initial labeling model based on at least one of the loss values obtained.

In an implementation, the apparatus further includes a correction module. The correction module is configured to: correct the label information of the slice image in response to a correction operation on the label information of the slice image and based on the correction operation; and input the corrected label information into the labeling model, so that the labeling model re-labels the plurality of vertex positions of the polygonal region in the slice image based on the corrected label information, so as to obtain label information.

In an implementation, the cutting module 702 is configured to cut the slice image based on a target size to obtain a plurality of image blocks of the target size.

In the apparatus according to this embodiment of this application, a plurality of cut-out image blocks are directly inputted into the labeling model. The labeling model automatically labels vertex positions of the polygonal region in the slice image, concatenates the vertex positions, and outputs the label information. The polygonal region is determined by labeling the vertex positions of the polygonal region. The determined polygonal region meets the characteristics of the target human tissue region. The characteristics of the target human tissue region are that the edges of the region are continuous and the region includes no pores. Therefore, the image is processed more accurately. Further, complexity of an image processing process is reduced greatly because the slice image does not have to be predicted in a pixel-wise manner. In addition, the labeling process is automatically performed by the labeling model without relying on manually labeled data, thereby greatly reducing labor costs, and effectively increasing the labeling speed, and in turn, improving the efficiency of image processing.

When the artificial intelligence-based image processing apparatus according to the foregoing embodiment processes an image, the functional assignment to the foregoing functional modules is merely exemplary. In practical applications, the foregoing functions may be assigned to and performed by different functional modules as required. To be specific, an internal structure of the computer device may be divided into different functional modules to perform all or part of the functions described above. In addition, the artificial intelligence-based image processing apparatus according to the foregoing embodiment and the artificial intelligence-based image processing method are attributable to the same concept. For a detailed implementation process of the apparatus, refer to the method embodiment, and details are omitted herein.

The computer device may be a terminal shown in FIG. 8 or a server shown in FIG. 9 below, without being limited herein.

Figure 8:
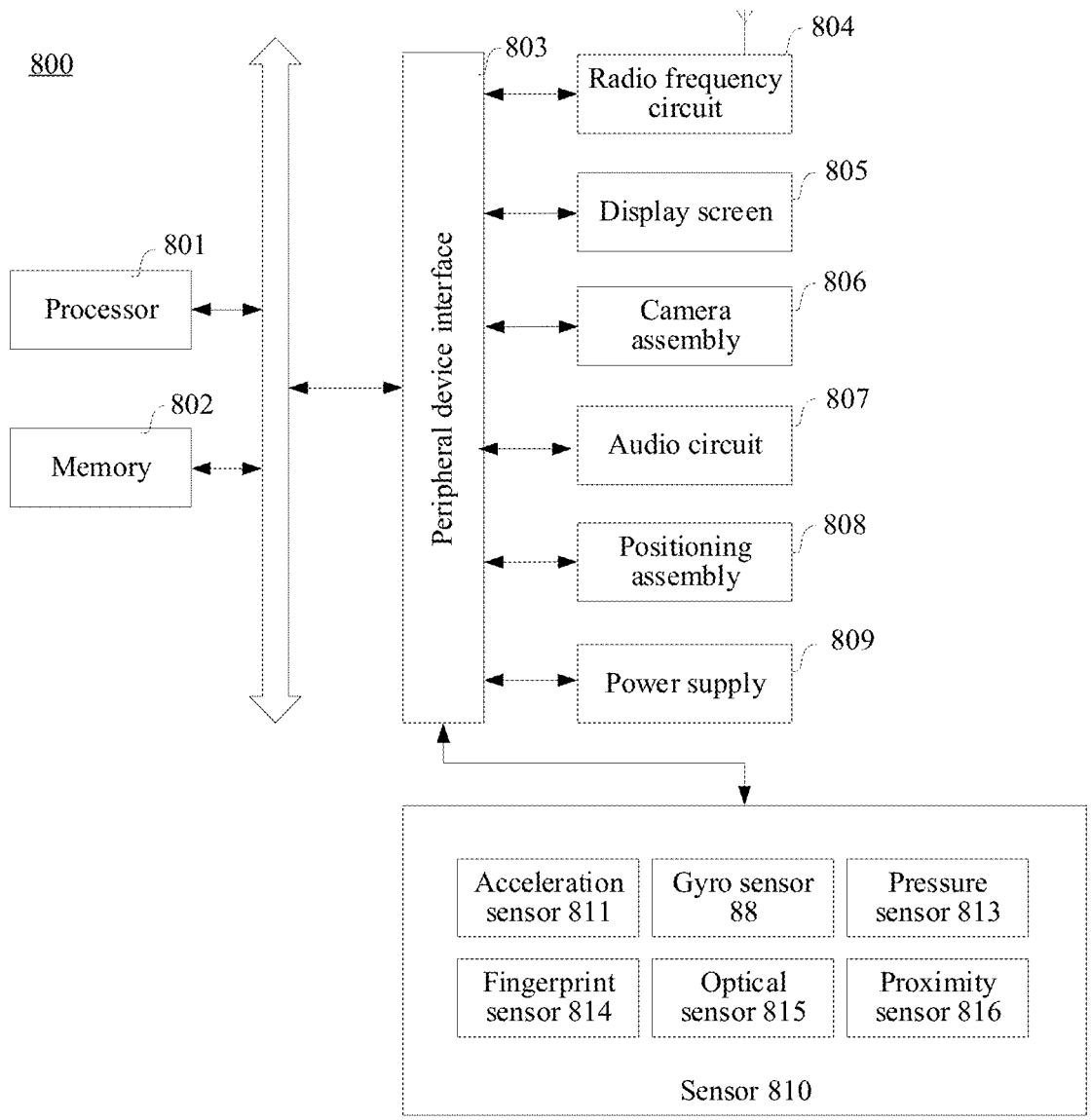
FIG. 8 is a schematic structural diagram of a terminal according to embodiment of this application.

FIG. 8 is a schematic structural diagram of a terminal according to embodiment of this application. The terminal 800 may be: a smartphone, a tablet computer, a Moving Picture Experts Group Audio Layer III (MP3) player, a Moving Picture Experts Group Audio Layer IV (MP4) player, a notebook computer, or a desktop computer. The terminal 800 may also be referred to as user equipment, a portable terminal, a laptop terminal, a desktop terminal, or the like.

Generally, the terminal 800 includes: a processor 801 and a memory 802.

The processor 801 may include one or more processing cores such as 4 cores, 8 cores, or the like. The processor 801 may be implemented in at least one of the following hardware forms: digital signal processor (DSP), field-programmable gate array (FPGA), and programmable logic array (PLA). The processor 801 may also include a main processor and a coprocessor. The main processor is a processor configured to process data that is in an active state, and is also referred to as a central processing unit (CPU). The coprocessor is a low-power-consumption processor configured to process data that is in a standby state. In some embodiments, the processor 801 may be integrated with a graphic processing unit (GPU). The GPU is configured to render and plot what needs to be displayed on a display screen. In some embodiments, the processor 801 may further include an artificial intelligence (AI) processor. The AI processor is configured to process computing operations related to machine learning.

The memory 802 may include one or more computer-readable storage media. The computer-readable storage media may be non-transitory. The memory 802 may further include a high-speed random access memory and a non-volatile memory, such as one or more disk memory devices or flash memory devices. In some embodiments, the non-transitory computer-readable storage medium in the memory 802 is configured to store at least one piece of program code. The at least one piece of program code is used for being executed by the processor 801 to implement the artificial intelligence-based image processing method according to a method embodiment of this application.

In some embodiments, the terminal 800 may, in some embodiments, further include: a peripheral device interface 803 and at least one peripheral device. The processor 801, the memory 802, and the peripheral device interface 803 may be connected by a bus or a signal wire. Each peripheral device may be connected to the peripheral device interface 803 by a bus, a signal wire, or a circuit board. Specifically, the peripheral device includes at least one of: a radio frequency circuit 804, a touchscreen 805, a camera 806, an audio circuit 807, a positioning component 808, or a power supply 809.

In some embodiments, the terminal 800 further includes one or more sensors 810. The one or more sensors 810 include, but are not limited to, an acceleration sensor 811, a gyro sensor 812, a pressure sensor 813, a fingerprint sensor 814, an optical sensor 815, and a proximity sensor 816.

A person skilled in the art understands that the structure shown in FIG. 8 does not constitute any limitation on the terminal 800. The terminal may include more or fewer components than what is shown in the drawing, or may combine some of the components, or may be configured with different component arrangements.

Figure 9:
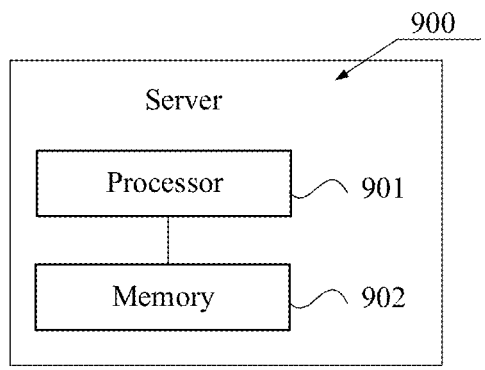
FIG. 9 is a schematic structural diagram of a server according to embodiment of this application.

FIG. 9 is a schematic structural diagram of a server according to an embodiment of this application. The server 900 may vary greatly depending on configurations or performance, and may include one or more central processing units (CPUs) 901 and one or more memories 902. The memory 902 stores at least one piece of program code. The at least one piece of program code is loaded and executed by the CPUs 901 to implement the artificial intelligence-based image processing method according to each method embodiment described above. Definitely, the server may further include components such as a wired or wireless network interface, a keyboard, and an input/output interface to facilitate input and output. The server may further include other components configured to implement device functions, details of which are omitted herein.

In an exemplary embodiment, a computer-readable storage medium is further provided, such as a memory that includes program code. The program code can be executed by a processor to implement the artificial intelligence-based image processing method according to an embodiment described above. For example, the computer-readable storage medium may be a read-only memory (ROM), a random access memory (RAM), a compact disc read-only memory (CD-ROM), magnetic tape, a floppy disk, an optical data storage device, or the like.

In an exemplary embodiment, a computer program product or a computer program is further provided. The computer program product or the computer program includes a computer instruction. The computer instruction is stored in a computer-readable storage medium. The processor of the computer device reads the computer instruction in the computer-readable storage medium. The processor executes the computer instruction to cause the computer device to implement the artificial intelligence-based image processing method provided in various optional implementations according to various embodiments described above.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

A person of ordinary skill in the art understands that all or part of the steps of the embodiments may be implemented by hardware or a program instructing related hardware. The program may be stored in a computer-readable storage medium. The storage medium may be a read-only memory, a magnetic disk, an optical disk, or the like.

What is described above is merely exemplary embodiments of this application, but is not intended to limit this application. Any modifications, equivalent substitutions, and improvements made without departing from the spirit and principles of this application still fall within the protection scope of this application.

What is claimed is:

1. An artificial intelligence-based image processing method, executed by a computer device, the method comprising:
   obtaining a slice image;
   dividing the slice image to obtain a plurality of image blocks;
   feeding the plurality of image blocks into a labeling model;
   extracting, by the labeling model, a segmentation mask of the slice image based on the plurality of image blocks, including:
      encoding the plurality of image blocks according to pixel values of the plurality of image blocks to obtain features corresponding to the plurality of image blocks; and
      decoding the obtained features to obtain the segmentation mask of the slice image;
   determining a plurality of vertex positions of a polygonal region in the slice image based on the segmentation mask;
   concatenating the plurality of vertex positions; and
   outputting label information of the slice image, the polygonal region being a region in which a target pathological tissue of interest is located.

2. The method according to claim 1, wherein the extracting the segmentation mask of the slice image is implemented based on a plurality of convolutional layers; and encoding the plurality of image blocks according to the pixel values of the plurality of image blocks to obtain the features of the plurality of image blocks comprises:
  performing a first convolution operation on adjacent image blocks in the plurality of image blocks based on a plurality of first convolutional layers to obtain first features;
  performing a first batch normalization on the first features to obtain second features; and
  performing downsampling on the second features based on first selection parameters in first model parameters by using a first convolution kernel corresponding to the first selection parameters, so as to obtain the features of the plurality of image blocks.

3. The method according to claim 2, wherein decoding the obtained features to obtain the segmentation mask of the slice image comprises:
  performing a second convolution operation on the features of the adjacent image blocks in the plurality of image blocks based on a plurality of second convolutional layers to obtain third features;
  performing a second batch normalization on the third features to obtain fourth features; and
  performing a deconvolution operation on the fourth features based on second selection parameters in second model parameters by using a second convolution kernel corresponding to the second selection parameters, so as to obtain the segmentation mask of the slice image.

4. The method according to claim 2, wherein decoding the obtained features to obtain the segmentation mask of the slice image comprises:
  decoding, for each second convolutional layer of a plurality of second convolutional layers, a feature outputted by a previous second convolutional layer prior to the each second convolutional layer based on a feature outputted by a first convolutional layer of the plurality of first convolutional layers corresponding to the each second convolutional layer, so as to obtain an output of the each second convolutional layer, the plurality of second convolutional layers being adjacent to each other; and
  concatenating the features outputted by the plurality of second convolutional layers to obtain the segmentation mask of the slice image.

5. The method according to claim 1, wherein determining the plurality of vertex positions of the polygonal region in the slice image based on the segmentation mask, concatenating the plurality of vertex positions, and outputting the label information of the slice image, comprise:
  performing a convolution operation on the segmentation mask based on a two-layer convolutional long short-term memory ConvLSTM model to obtain the plurality of vertex positions of the polygonal region in the slice image.

6. The method according to claim 5, wherein performing the convolution operation on the segmentation mask based on the two-layer convolutional long short-term memory ConvLSTM model to obtain the plurality of vertex positions of the polygonal region in the slice image comprises:
  feeding the segmentation mask into the two-layer ConvLSTM model;
  performing, by the two-layer ConvLSTM model, the convolution operation on segmentation masks of surrounding grid cells of a plurality of target grid cells;
  encoding a result of the convolution operation to obtain segmentation masks of the target grid cells;
  using the segmentation masks of the plurality of target grid cells as the plurality of vertex positions of the polygonal region in the slice image.

7. The method according to claim 6, wherein feeding the segmentation mask into the two-layer ConvLSTM model, performing, by the two-layer ConvLSTM model, the convolution operation on the segmentation masks of surrounding grid cells of the plurality of target grid cells, encoding the result of the convolution operation to obtain the segmentation masks of the target grid cells, and using the segmentation masks of the plurality of target grid cells as the plurality of vertex positions of the polygonal region in the slice image, comprise:
  feeding the segmentation masks into the two-layer ConvLSTM model;
  performing, by the two-layer ConvLSTM model, a first convolution operation on the segmentation masks of surrounding grid cells of a first target grid cell of the plurality of target grid cells;
  encoding the result of the first convolution operation to obtain a segmentation mask of the first target grid cell;
  using the segmentation mask of the first target grid cell as a first vertex position;
  performing, by the ConvLSTM model, a second convolution operation on segmentation masks of surrounding grid cells of a second target grid cell of the plurality of target grid cells based on the segmentation mask and the first vertex position;
  encoding a result of the second convolution operation to obtain a segmentation mask of the second target grid cell, and using the segmentation mask of the second target grid cell as a second vertex position; and
  continuing to perform convolution operations and encoding based on the pixel feature, the first vertex position, and the second vertex position until the plurality of vertex positions of the polygonal region are obtained.

8. The method according to claim 1, wherein the labeling model is trained by a process which comprises:
  obtaining a plurality of sample slice images, the sample slice images carrying target label information;
  feeding the plurality of sample slice images into an initial labeling model, and predicting, by the initial labeling model, label information in the plurality of sample slice images to obtain predicted label information; and
  adjusting model parameters of the initial labeling model based on the predicted label information and the target label information until a target condition is met, so as to obtain the labeling model.

9. The method according to claim 8, wherein the predicting, by the initial labeling model, label information in the plurality of sample slice images to obtain predicted label information, comprises:
  determining, by the initial labeling model, first two vertex positions in the target label information as first two vertex positions in the sample slice image; and
  predicting a next vertex position based on the first two vertex positions and the sample slice image to obtain the predicted label information.

10. The method according to claim 8, wherein the adjusting model parameters of the initial labeling model based on the predicted label information and the target label information comprises:
  performing at least one of: (i) obtaining a prediction loss value based on the predicted label information and the target label information; (ii) obtaining a segmentation loss value based on a predicted segmentation mask and a target segmentation mask of the sample slice image;

or (iii) obtaining a constraint loss value between the predicted segmentation mask and the predicted label information; and adjusting the model parameters of the initial labeling model based on at least one of the loss values obtained.

11. The method according to claim 1, the method further comprising:

correcting the label information of the slice image in response to a correction operation on the label information of the slice image and based on the correction operation; and feeding the corrected label information into the labeling model, and re-labeling, by the labeling model, the plurality of vertex positions of the polygonal region in the slice image based on the corrected label information, so as to obtain the label information.

12. A computer device, comprising a processor and a memory, wherein the memory stores instructions that, when executed by the processor, cause the computer device to perform operations comprising:

obtaining a slice image;

dividing the slice image to obtain a plurality of image blocks;

feeding the plurality of image blocks into a labeling model;

extracting, by the labeling model, a segmentation mask of the slice image based on the plurality of image blocks, including:

encoding the plurality of image blocks according to pixel values of the plurality of image blocks to obtain features corresponding to the plurality of image blocks; and decoding the obtained features to obtain the segmentation mask of the slice image;

determining a plurality of vertex positions of a polygonal region in the slice image based on the segmentation mask;

concatenating the plurality of vertex positions; and outputting label information of the slice image, the polygonal region being a region in which a target pathological tissue of interest is located.

13. The computer device according to claim 12, wherein the extracting the segmentation mask of the slice image is implemented based on a plurality of convolutional layers; and encoding the plurality of image blocks according to the pixel values of the plurality of image blocks to obtain the features of the plurality of image blocks comprises:

performing a first convolution operation on adjacent image blocks in the plurality of image blocks based on a plurality of first convolutional layers to obtain first features;

performing a first batch normalization on the first features to obtain second features; and performing downsampling on the second features based on first selection parameters in first model parameters by using a first convolution kernel corresponding to the first selection parameters, so as to obtain the features of the plurality of image blocks.

14. The computer device according to claim 13, wherein decoding the obtained features to obtain the segmentation mask of the slice image comprises:

performing a second convolution operation on the features of the adjacent image blocks in the plurality of image blocks based on a plurality of second convolutional layers to obtain third features;

performing a second batch normalization on the third features to obtain fourth features; and performing a deconvolution operation on the fourth features based on second selection parameters in second model parameters by using a second convolution kernel corresponding to the second selection parameters, so as to obtain the segmentation mask of the slice image.

15. The computer device according to claim 13, wherein decoding the obtained to obtain the segmentation mask of the slice image comprises:

decoding, for each second convolutional layer of a plurality of second convolutional layers, a feature outputted by a previous second convolutional layer prior to the each second convolutional layer based on a feature outputted by a first convolutional layer of the plurality of first convolutional layers corresponding to the each second convolutional layer, so as to obtain an output of the each second convolutional layer, the plurality of second convolutional layers being adjacent to each other; and concatenating the features outputted by the plurality of second convolutional layers to obtain the segmentation mask of the slice image.

16. The computer device according to claim 12, wherein determining the plurality of vertex positions of the polygonal region in the slice image based on the segmentation mask, concatenating the plurality of vertex positions, and outputting the label information of the slice image, comprise:

feeding the segmentation mask into a two-layer ConvLSTM model, performing, by the two-layer ConvLSTM model, a convolution operation on segmentation masks of surrounding grid cells of a plurality of target grid cells, encoding a result of the convolution operation to obtain segmentation masks of the target grid cells, and using the segmentation masks of the plurality of target grid cells as the plurality of vertex positions of the polygonal region in the slice image.

17. The computer device according to claim 12, wherein the labeling model is trained by a process which comprises:

obtaining a plurality of sample slice images, the sample slice images carrying target label information;

feeding the plurality of sample slice images into an initial labeling model, and predicting, by the initial labeling model, label information in the plurality of sample slice images to obtain predicted label information; and adjusting model parameters of the initial labeling model based on the predicted label information and the target label information until a target condition is met, so as to obtain the labeling model.

18. A non-transitory computer-readable storage medium, storing at least one piece of program code, wherein the program code, when executed by a processor of a computer device, cause the computer device to perform operations comprising:

obtaining a slice image;

dividing the slice image to obtain a plurality of image blocks;

feeding the plurality of image blocks into a labeling model;

extracting, by the labeling model, a segmentation mask of the slice image based on the plurality of image blocks, including:

encoding the plurality of image blocks according to pixel values of the plurality of image blocks to obtain features corresponding to the plurality of image blocks; and decoding the obtained features to obtain the segmentation mask of the slice image;
determining a plurality of vertex positions of a polygonal region in the slice image based on the pixel feature;
concatenating the plurality of vertex positions; and
outputting label information of the slice image, the polygonal region being a region in which a target pathological tissue of interest is located.

* * * * *